Nov. 14, 1967 W. ZAHN 3,352,316
GATE VALVE WITH STRIPPER RINGS FOR PLASTIC MELTS
Filed May 27, 1965
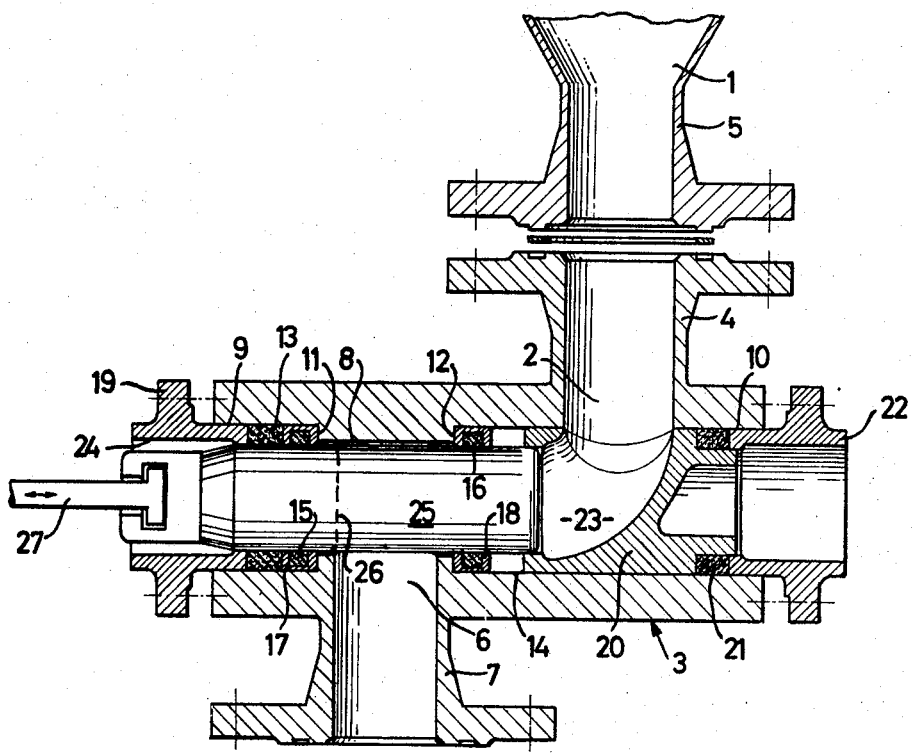
INVENTOR.
WILLY ZAHN United States Patent Office 3,352,316
Patented Nov. 14, 1967

3,352,316
GATE VALVE WITH STRIPPER RINGS
FOR PLASTIC MELTS
Willy Zahn, Offenbach (Main), Germany, assignor to Hans J. Zimmer Verfahrenstechnik, Frankfurt am Main, Germany
Filed May 27, 1965, Ser. No. 459,326
Claims priority, application Germany, June 6, 1964, Z 9,264
2 Claims. (Cl. 137—242)

ABSTRACT OF THE DISCLOSURE

A valve for controlling the flow of plastic material which includes a housing with a bore. A piston having a uniform outer surface moves axially in the bore. An inlet and an outlet communicate with the bore. One end of the bore has means in intimate sliding contact with the uniform outer surface of the piston so as to seal the bore from the exterior. Means are also provided at the other end of the bore in intimate sliding contact with the piston so as to seal the inlet from the outlet when the piston contacts both of the sealing means. Both of the sealing means cooperate to define sole guide means for the movement of the piston. Stripper means are provided at both ends of the bore for removing fluid from the uniform outer surface of the piston as it moves in the bore. Means are connected to the piston to move the piston axially in the bore.

---

This invention relates to a gate valve for controlling flow of plastic melts, for example polyamide melts. In particular, the invention relates to a novel gate valve comprising an axially movable, essentially cylindrical blocking piston which moves in a bore connecting two offset fluid lines, the bore being provided with special packing glands which seal the bore and piston and provide a stripping action upon movement of the piston.

In prior art gate valves of the type used for controlling flow of plastic melts, the valve comprises a conical casing seat into which a cone is inserted for closure, which cone may be attached to the end of a movable piston. Fluid flows through the seat and around the cone when the valve is open and, when closed, the cone fits snugly into the seat to prevent fluid flow. Such valves have been found to be unsatisfactory because at the seating surfaces incrustations of solidified plastic material form which renders a tight, especially vacuum-tight, sealing impossible. Furthermore, because of high temperature of plastic melts, there frequently occurs a deformation of the slide casing in which the cone and its piston move, preventing centered seating of the cone on the conical seat and good contact of the cone surfaces. Furthermore, the formations of solidified plastic material presents a constant threat to product quality, since it often dislodges and contaminates into the flow stream.

Broadly, valves with closing pistons and ring packings are known. These valves, however, are designed for use with low-viscosity flow media, such as gases, vapors and water, and therefore, they are unsuitable for high-viscosity media, as, for example, for plastic melts, because of dead spaces formed in the flow path by piston constrictions, etc. Such dead spaces are detrimental in plastic melt lines since they permit harmful depositing of solidified material. Moreover, in such valves the piston is not supported solely by sealing packings, but has special guides with packing devices which makes the construction cumbersome.

It is thus an object of this invention to provide a gate valve for the control of flow of plastic melts wherein there is eliminated undesirable solidification of plastic material on valve parts.

It is a further object of this invention to provide a gate valve of simple construction which is reliable and not susceptible to blocking or contamination by solidified plastic flow materials.

It is yet another object of this invention to provide a gate valve free of all voids in which plastic flow materials tend to solidify and later dislodge to contaminate the flow stream.

Other objects will become apparent as the invention is more fully described hereinafter.

The drawing illustrates in section one embodiment of the invention.

This invention eliminates the above mentioned drawbacks by providing a valve structure hereinafter more fully described wherein there is an outer packing gland and an inner packing gland, the inner gland surrounding the inner end of a movable piston when the valve is in closed position. The inner end of the piston and the surrounding packing are supported on a ring shoulder in the valve bore so that an outer packing gland in conjunction with the inner packing gland form the sole guide means for the piston. In this arrangement deposition of solids on the packing surfaces or the valve parts cannot occur, since the relative movement of the piston and packing glands create a stripping effect which removes all plastic material. Thus the packing surfaces are constantly kept clean and the packings due to their elasticity have a long life with no centering problems caused by heat deformation.

The slide valve according to the invention is designed to eliminate void spaces. Both the inner and outer packing glands are independently insertable into the valve casing and may be tightened into the casing as desired, as described hereinafter.

In addition, stripping action of the packing glands is effected by providing a stripping ring inside each gland with the stripping rings facing each other. In this way the packing material of the packing gland never contacts the piston when it is coated or covered with flow material, as is explained in detail hereinafter. The stripping rings are preferably made of carbon, such as pressed graphite, and are in each case, inserted in a metal supporting ring, hereinafter described.

Details of the invention are described as follows with the aid of the drawing which shows, as one embodiment, the gate valve according to the invention.

Referring to the drawing, the gate valve is secured as a flow control means to a container shown partially at 1, which is, for example, a polymerization autoclave for the production of a polyamide. Container 1 is connected by a flange to valve casing 3 through connecting pieces 4 and 5, thereby creating a bore 2 through which fluid flows from container 1 to the valve. Casing 3 is further provided with exhaust bore 6 laterally offset with respect to entry bore 2 in casing 3. Connecting piece 7 which defines bore 6 is connected preferably with a means (not shown) for the production of, for example, bands, foils, cables or threads of solid plastic material, for example polyamide.

Casing 3 is further provided with axial bore 8, which communicates with exhaust bore 6 and connected axial bores 9 and 10 which extend to both ends of the casing. Bores 9 and 10 are of greater diameter than bore 8 and form shoulders 11 and 12, respectively with bore 8. In bores 9 and 10 are packing glands which consist of sealing rings 13 or 14 and stripping rings 15 or 16. The stripping rings are preferably made of carbon or other non-absorbent material and are inserted in inner grooves of metal supporting rings 17 and 18. The outer packing box comprising sealing ring 13, stripping ring 15 and support ring 17, is pressed by a packing gland 19 thrust into bore 9.

Against the inner packing box comprising sealing ring 14, stripping ring 16 and support ring 18, there is placed an inset body 20, for example a cast body, which is introduced snugly but removably into bore 10. At its outer end inset body 20 is provided with a portion of diameter smaller than bore 10, on which there is placed a sealing ring 21. Ring 21 is pressed inwardly by packing gland 22 which engages in bore 10. Gland 22 corresponds in its dimensions to the packing gland 19. Pressure applied axially to gland 22 is propagated through inset 20 and transmitted to inner sealing ring 14 to seal such ring in bore 10.

Inset body 20 has a flow recess 23 which connects entry bore 2 directly without any void spaces to the passage opening of the inner packing box. Inset body 20 is secured against rotation in casing 3 by any known means, e.g., by a key slot.

Packing gland 19 is provided with an interior bore 24 through which the piston 25 is introduced into the valve casing. In the position shown in the drawing, piston 25 is in the blocking position, that is, its inner end engages the inner packing box and the valve is closed. The open position of the valve is indicated by broken line 26 whereat piston 25 is to the extreme left and permits bores 2 and 6 to communicate.

At its outer end piston 25 is secured to an operating spindle 27 which is axially slidable. Spindle 27 is secured to any known means for axial movement (not shown) such as a motor or reciprocating piston which may be supported by casing 3 or gland 19.

As the drawing indicates, piston 25 floats in the two packing boxes which not only bring about a secure packing of valve interior space to the outside or to the entry bore with respect to the exhaust bore, but also guides the piston. Stripping rings 15 and 16 bearing on ring shoulders 11 and 12 provide no seal in themselves, but insure that outer packing seal 13 does not come in contact with flow material and that piston 25, on sliding into the inner packing box, is first stripped before contacting packing seal 14. Because of these positional arrangements and because the two packing boxes are independently secured, they may be packed with different materials and may be secured and maintained separately.

As can be seen from the above description, the gate valve according to the invention has no void spaces in its interior in which plastic melts might tend to solidify and form incrustations. Axial bore 8, the surfaces of the inner packing boxes which contact the piston and the surfaces covering the piston 25 itself remain free of deposits of solids during operation because these surfaces reciprocally strip and cleanse themselves. As is evident from the drawing, in addition, bore 6 and the interior of connecting piece 7 can easily be ridded of solids possibly adhering from underneath since they are relatively short straight bores and are easily accessible to cleaning.

Instead of the illustrated position of the gate valve as shown in the drawing, it should be clear to the art-skilled that one can use the valve mounted with a 180° turn on outlet connecting piece 5 of the container 1, whereby bore 2 becomes the exhaust bore and bore 6 becomes the entry bore.

Having disclosed my invention, those skilled in the art will recognize that various modifications may be made all within the scope of the invention which I intend to limit solely by the following claims.

I claim:
1. A valve useful for controlling the flow of plastic melts comprising a valve housing having a bore, a piston having a uniform outer surface slightly spaced from the bore of the housing along its entire length and being axially movable in said bore, fluid inlet means communicating with said bore, fluid outlet means communicating with said bore, means at one end of said bore in intimate sliding contact with the uniform outer surface of said piston for sealing the bore from the exterior, means at the other end of said bore in intimate sliding contact with said outer surface for sealing the inlet means from the outlet means when said uniform outer surface is in contact with both of said sealing means, said sealing means at said other end being out of contact with said piston when said plastic melts are being passed from said inlet means to said outlet means, both of said sealing means defining the sole guide means for the movement of said piston, stripper means at both ends of said bore in direct engagement with said sealing means and in sliding contact with said piston for removing fluid from said uniform outer surface as said piston moves axially in said bore, said stripper means comprising support rings with carbon ring inserts, means operatively connected to said piston for moving said piston axially in said bore and separate means are provided for each pair of said sealing means and said stripper means for securing said sealing means and said stripper means in place within said valve housing.

2. The valve of claim 1 wherein said sealing means are circumferential rings positioned within said bore, and said stripper means are circumferential rings of non-absorbent material positioned within said bore.

References Cited

UNITED STATES PATENTS

| Re. 23,894 | 11/1954 | Burkhard et al. | 277—24 |
| 851,370 | 4/1907 | Nolan | 251—324 X |
| 937,096 | 10/1909 | Schmid | 251—325 |
| 1,438,325 | 12/1922 | Nelson et al. | 251—325 |
| 1,715,665 | 6/1929 | Mason | 251—324 |
| 3,093,581 | 6/1963 | Pall et al. | 277—234 |

M. CARY NELSON, *Primary Examiner.*

A. ROSENTHAL, *Examiner.*

UNITED STATES PATENT OFFICE
CERTIFICATE OF CORRECTION

Patent No. 3,352,316　　　　　　　　　　　　　November 14, 1967

Willy Zahn

It is hereby certified that error appears in the above numbered patent requiring correction and that the said Letters Patent should read as corrected below.

In the heading to the printed specification, lines 4 to 6, for "assignor to Hans J. Zimmer Verfahrenstechnik, Frankfurt am Main, Germany" read -- assignor, by mesne assignments, to Vickers-Zimmer Aktiengesellschaft, Planung und Bau von Industrieanlagen, Frankfurt am Main, Germany, a corporation of Germany --.

Signed and sealed this 7th day of January 1969.

(SEAL)

Attest:

Edward M. Fletcher, Jr.

Attesting Officer

EDWARD J. BRENNER

Commissioner of Patents